United States Patent Office 3,430,717
Patented Mar. 4, 1969

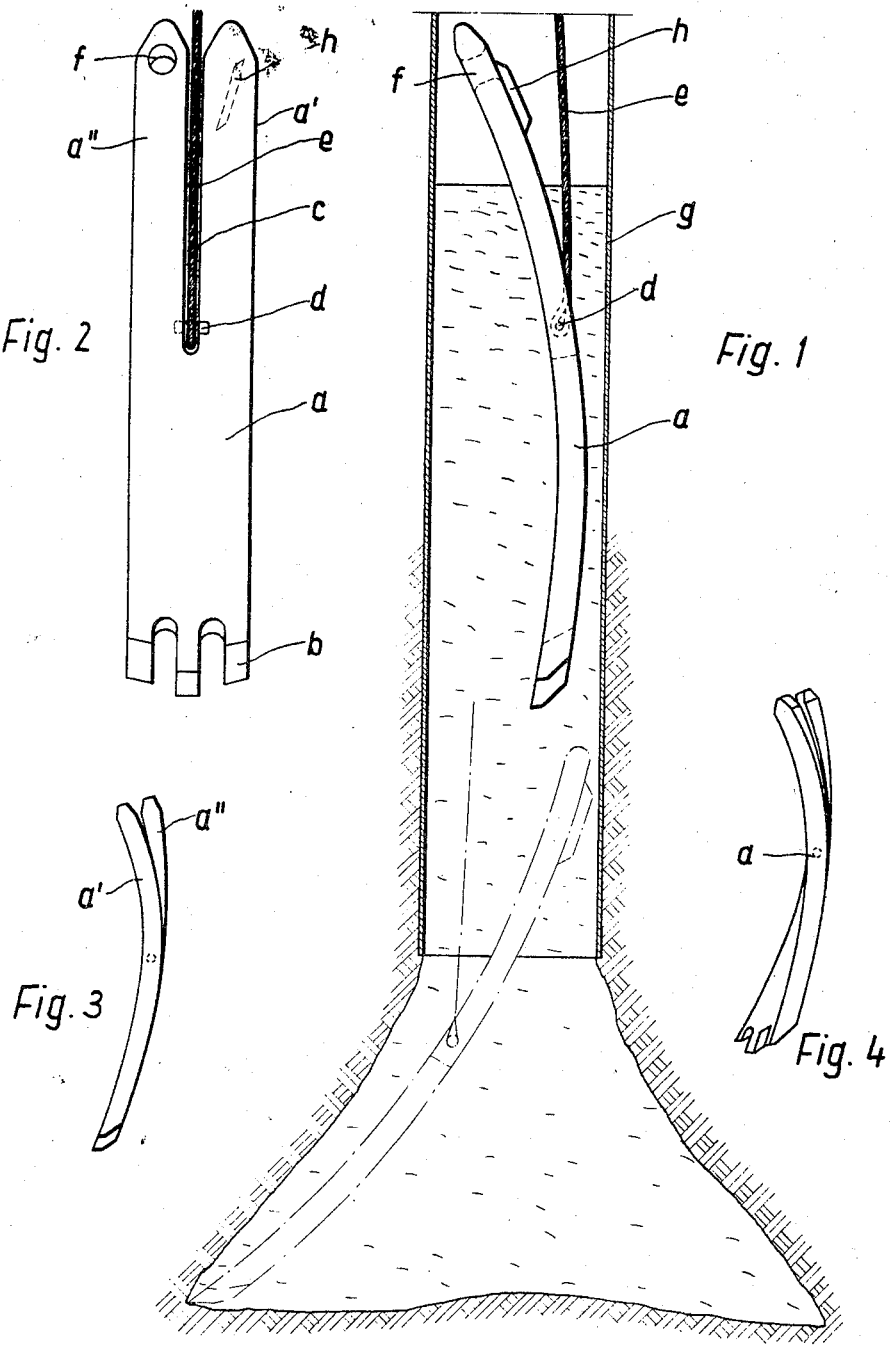

3,430,717
BROACHING TOOL FOR BORE HOLES PARTLY FILLED WITH WATER
Robert Hochstrasser, deceased, late of Saarbrucken, Germany, by Elisabeth Hochstrasser and Jurgen Hochstrasser, administrators, both of Kobenhuttenweg 22, Saarbrucken, Germany
Filed Jan. 9, 1967, Ser. No. 609,274
Claims priority, application Germany, Apr. 6, 1966, H 59,028; Aug. 19, 1966, H60,280
U.S. Cl. 175—263                7 Claims
Int. Cl. E21b *11/00;* E21c *19/00*

ABSTRACT OF THE DISCLOSURE

To widen a bore hole having its lower end filled with water, an arcuately curved elongate tool with teeth at its lower end is dropped into the hole while being suspended from a rope attached to the tool body above its center of gravity within a longitudinal slot thereof. The body may be unsymmetrically shaped about its plane of curvature, thereby imparting to the dropping tool a certain torque which causes it to rotate progressively in the hole upon successive drops.

---

The invention relates to a method and an apparatus for widening the end of bore holes drilled into the soil.

When drilling into the soil, the drill hole must often be widened or expanded, esepcially for the manufacture of foundation piles.

A multitude of apparatus for broaching or widening such bore holes are known in the art, usually in the form of rotating drilling tools with spreading vanes or cutters, or as rolling augers. These rotating drilling devices require a rotating drive with strong drill pipe, which must be fitted and dismantled for every use. In drilling operations according to the percussion or rock-drilling method, which is used mainly for making foundation piles, such rotary drive and drill pipe are not necessary for the initial penetration but must be kept available separately for the broaching operation. Moreover, rotary drills are little suitable for work in soil sections containing stones or rock.

The invention has the object of providing a broaching method and tool, adapted to be used, without complications and additional expense, especially in drill holes made according to the percussion drilling method.

In practicing the invention, the drill hole is filled, at least in the zone of its lower end, with liquid (usually water) which serves as a guide medium for the trajectory to be given to a cutting tool. Thus, the drill hole is first drilled to a depth including the part to be expanded so as to form a cylindrical bore whereupon, in the absence of ground water or with insufficient ground water, the lower end of the drill hole is filled with water, a cutting tool being then periodically dropped from a higher level into the zone to be widened, wherein the water, upon impact, imparts to the tool a trajectory intersecting the wall of the drill hole.

The drop cutter according to the invention consists of an elongate plate-shaped body, arcuately curved in a longitudinal plane and equipped at its leading lateral edge with cutting teeth, suspneded rotatably above its center of gravity from a rope and slotted from the point of suspension upwardly to give clearance to the suspension means and enable unimpeded rotation of the tool.

According to a further feature of the invention, the two halves of the tool body on either side of the rope receiving longitudinal slot are so formed that they impart to the tool body a unidirectional torque about its suspension element during each stroke to let the cutting point of the tool progressively sweep the circumference of the drill hole.

In order to obtain the desired dissymmetry of the tool-body halves about the plane of curvature, one or more holes may be provided in the upper part of the tool on one side of the slot. These holes reduce the area of attack of the liquid on this one side, causing the tool to rotate during its fall and the cutting edge to be displaced along the periphery of the drill hole. Such an aperture may also be used in the case of rope rupture as a point of engagement for a grappling hook enabling the cutter to be retrieved. If desired, both sides of the tool body may be apertured in such a way that the area of attack is smaller on one side.

According to another feature of the invention, there may be arranged on at least one half of the cutter, in its upper region of its convex surface, guide fins inclined so as to impart the desired rotational motion to the cutter during every descent, assuring the uniform widening of the drill hole. The same result may be obtained by letting the curvatures of the two cutter halves differ within the zone of the winch rope so as to make them diverge upwardly in the plane of curvature. Moreover, the cutter body as a whole may have a twist which also generates a rotational component, leading to the desired angular displacement.

The invention will be further described, by way of example, with reference to the accompanying drawing in which:

FIGURE 1 is a side elevation of a cutter according to the invention suspended in a drill hole, shown in full lines in an inoperative position and in dotted lines, in a working position;

FIGURE 2 shows the convex side of the tool body;

FIGURE 3 shows, in side elevation, a modified cutter with different curvatures of the tool body halves; and FIGURE 4 shows another modified cutter twisted over its full length.

As may be seen from the drawing, a drop cutter according to the invention consists of an arcuate plate *a* which is curved in a vertical plane and equipped with cutting teeth *b* (FIGURE 2) pointed toward the concave side. The plate *a* is suspended by means of an anchor pin *d* engaged by a flexible element, i.e. a rope *e*. As shown in FIGURE 1, the pin *d* is located slightly above the center of gravity of the tool body *a* (indicated by a dotted line), and is also slightly offset laterally towards the convex side of the tool which is substantially tangent to rope *c* in the freely suspended full-line position. In view of this arrangement of the pin *d*, the cutter is suspended in the drill hole, lined with a pipe *g*, with its teeth *l* directed downwardly, these teeth including a longer central tooth and two shorter flanking teeth. The pipe *g* prevents the teeth from leaving its vertical position prematurely and from entering into its oblique working position. As shown in FIGURE 2, the drop cutter has a central slot *c* spanned by the pin *d*. Owing to the presence of this slot *c*, the tool can swing freely about the pin *d* during its transition from the inoperative position into the working position (shown dotted in FIGURE 1). The tool body *a*, having with larger drill holes a weight of several tons, is introduced from above into the drill hole where it assumes the position shown in solid lines in FIGURE 1. In this starting position, the cutting edges of the auger are slightly above the lower edge of the tubular lining *g*. Below the pipe *g*, the drill hole is first drilled cylindrically to the depth corresponding to that of the intended widened portion. The lower part of the drill hole must be filled with water so that the cutter is suspended substantially in the water in its starting position. If ground water is not available or is insufficient, water is introduced into the hole from the top.

For the broadening operation, the cutter *a* is allowed to drop from its elevated position, shown in FIGURE 1 in solid lines, by slackening the winch rope *e*. During its drop into the dotted-line position, the tool describes an arcuate path, corresponding to the curvature of its body, because the water exerts, by its inertia, a guiding force on the convex and concave surfaces thereof. This guide effect increases with increasing speed. The trajectory produced in this way guides the teeth *b* of the cutter obliquely against the wall of the bore. During its impact, the tool tends to tilt backwards; the major part of this tilting effort is absorbed by the water and strong impacts against the drill-hole pipe *g* are avoided. The material dislodged by the cutter is removed from time to time by a dredger or a gravel pump.

As shown in FIGURES 1 and 2, the left-hand half *a″* of the upper portion of the cutter body has a hole *f*, whereas the other half *a′* is solid. The hole *f* reduces the area of attack of the half *a″* for guiding the tool during its rise and descent in the liquid, with reference to the half *a′*, so that by this movement during each stroke the tool is rotated about the axis of the drill hole. The same rotation of the tool can be produced by means of a fin *h* on the convex side of half *a′*, this fin having a suitable inclination to the center line of the tool body. The hole *f* and the fin *h* may also be provided together.

As shown in FIGURE 3, the two halves *a′*, *a″* of the upper body section adjacent to the rope have different curvatures, which also produces a rotation of the tool body *a* during each drop.

The same effect is achieved if the cutter *a* is twisted over its entire length, as shown in FIGURE 4.

The advantages of a drop cutter according to the invention are based on the simplicity and strength of the tool *a* itself, which has no movable parts liable to become defective and which eliminates the risk of breakages even when working in difficult soils or in rock. The suspension of the tool *a* in the zone above its center of gravity has the advantage of producing an oblique starting position and ensuring that the trajectory is only slightly affected by the residual tension of the rope.

We claim:

1. A broaching tool for a bore hole partly filled with water, comprising an arcuately curved elongate body with cutting means at one end and a longitudinal slot extending from the opposite end toward the center of the body, anchor means in said slot at a location offset from the center of gravity of the body toward said opposite end, and a flexible suspension element engaging said anchor means and passing partly through said slot, said body having a convex side disposed substantially tangentially to said element upon said body hanging freely from said element, said cutting means including a formation pointed toward the concave side of said body for biting into the wall of the hole upon a dropping of the tool into the water therein.

2. A tool as defined in claim 1 wherein said slot divides a portion of said body adjacent said opposite end into two unsymmetrical halves for imparting a unidirectional torque to said body whereby said tool rotates about said element upon each lowering into the water.

3. A tool as defined in claim 2 wherein one of said halves is apertured.

4. A tool as defined in claim 2 wherein one of said halves is provided with a fin projecting from said convex side.

5. A tool as defined in claim 2 wherein said halves diverge from each other toward said opposite end in the plane of curvature of said body.

6. A tool as defined in claim 5 wherein said body is twisted over its entire length.

7. A tool as defined in claim 1 wherein said cutting means includes a central tooth in line with said slot and two shorter flanking teeth on opposite sides of said central tooth.

References Cited

UNITED STATES PATENTS

| | | | |
|---|---|---|---|
| 221,646 | 11/1879 | Williams | 175—398 X |
| 230,863 | 8/1880 | Cowles | 175—398 X |
| 281,922 | 7/1883 | Randall | 175—398 X |
| 711,506 | 10/1902 | Johnston | 175—267 |
| 1,888,282 | 11/1932 | Miller | 61—53.6 |
| 2,552,939 | 5/1951 | Condra | 166—170 X |

ERNEST R. PURSER, *Primary Examiner*.

U.S. Cl. X.R.

175—398; 299—94